No. 782,905.

Patented February 21, 1905.

UNITED STATES PATENT OFFICE.

RICHARD GLEY, OF BERLIN, GERMANY, ASSIGNOR TO ACTIEN GESELL-SCHAFT FÜR ANILIN FABRIKATION, OF BERLIN, GERMANY.

ORANGE SULFUR DYE AND PROCESS OF MAKING SAME.

SPECIFICATION forming part of Letters Patent No. 782,905, dated February 21, 1905.

Application filed November 30, 1904. Serial No. 234,959.

*To all whom it may concern:*

Be it known that I, RICHARD GLEY, of Berlin, in the Kingdom of Prussia, German Empire, have invented new and useful Improvements in the Manufacture of New Sulfurized Dyestuff and Process of Making Same; and I do hereby declare that the following is a full, clear, and exact description thereof, which will enable others skilled in the art to which it appertains to make and use the same.

I have found that new sulfurized dyestuffs are formed if mixtures of meta-toluylenediamin and diformyl-para-phenylenediamin are heated together with sulfur at high temperatures. The reaction product is, especially if well pulverized, directly soluble in an aqueous solution of sodium sulfid and dyes cotton clear orange-yellow shades of great intensity.

In carrying out my invention I proceed as follows, the parts being by weight:

Example: Prepare a mixture of forty parts of sulfur, ten parts of meta-toluylenediamin, and fourteen parts of diformyl-para-phenylenediamin, (this being obtained by the reaction of formic acid on para-phenylenediamin;) heat that mixture to 200° to 220°, the temperature being allowed to rise gradually, and keep the mass at this temperature till the evolution of sulfureted hydrogen ceases. After cooling, the mass is well pulverized or ground, yielding thereby a yellow powder.

The dyestuff thus produced is soluble in an aqueous solution of sodium sulfid with a brownish-yellow color. It dyes clear orange-yellow tints on unmordanted cotton, which show a great fastness to washing and light.

Of course many variations may be made in the foregoing example without essentially changing the result, so I may use instead of equal molecules of the aforementioned organic compounds a mixture containing for every molecule of one component any proportion from one to two molecules of the other. Generally mixtures in which diformyl-para-phenylenediamin prevails give products dyeing a more yellowish tint.

It is obvious to those skilled in the art that the dyestuff resulting from my process will vary a little in the tints obtained therewith if I alter the temperature at which the melt is carried out.

Now what I claim is—

1. The manufacture of a new sulfurized dyestuff by heating a mixture of diformyl-para-phenylenediamin and meta-toluylenediamin with sulfur to 200° and more.

2. The new sulfurized dyestuff obtained by the action of sulfur on a mixture of diformyl-para-phenylenediamin and meta-toluylenediamin, being, when well pulverized or ground, a yellow powder, insoluble in water and alcohol, soluble in an aqueous solution of sodium sulfid with a brownish-yellow color, dyeing from a bath containing sodium sulfid and common salt clear orange-yellow shades of great fastness to washing and light.

In witness whereof I have hereunto signed my name, this 5th day of November, 1904, in the presence of two subscribing witnesses.

RICHARD GLEY.

Witnesses:
 HENRY HASPER,
 WOLDEMAR HAUPT.